United States Patent
Rosenthal et al.

(10) Patent No.: US 11,158,927 B1
(45) Date of Patent: Oct. 26, 2021

(54) WIRELESS ACCESS POINT VERTICAL MOUNT

(71) Applicant: Juniper Networks, Inc., Sunnyvale, CA (US)

(72) Inventors: Joshua Rosenthal, San Jose, CA (US); John James Musante, Holtsville, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/934,704

(22) Filed: Jul. 21, 2020

(51) Int. Cl.
*H01Q 1/12* (2006.01)
*H04Q 1/02* (2006.01)
*H01Q 1/00* (2006.01)

(52) U.S. Cl.
CPC ........... *H01Q 1/1221* (2013.01); *H01Q 1/007* (2013.01); *H04Q 1/09* (2013.01); *H04Q 2201/808* (2013.01)

(58) Field of Classification Search
CPC ...... H01Q 1/12; H01Q 1/1221; H01Q 1/1007; H04Q 1/09; H04Q 2201/808
See application file for complete search history.

(56) References Cited

U.S. PATENT DOCUMENTS

| | | | |
|---|---|---|---|
| 7,039,366 B1* | 5/2006 | McDowell | E04B 9/04 455/562.1 |
| 2008/0048076 A1* | 2/2008 | De Wit | B60R 11/00 248/205.1 |
| 2011/0146163 A1* | 6/2011 | Naroditsky | H05K 5/0204 52/27 |
| 2014/0160717 A1* | 6/2014 | Malzone, Jr. | G06F 1/16 361/825 |
| 2014/0223726 A1* | 8/2014 | Bryant | H01Q 1/007 29/601 |

* cited by examiner

*Primary Examiner* — Hoang V Nguyen
(74) *Attorney, Agent, or Firm* — Shumaker & Sieffert, P.A.

(57) ABSTRACT

Disclosed is an attachment mechanism for attaching a wireless access point to a vertical structure, such as a wall. The attachment mechanism includes a bracket that is mounted to the vertical structure. The attachment mechanism also includes at least two engagement members positioned on opposing sides of the access point. The two engagement members are horizontally aligned, in some embodiments, when the access point is engaged with a bracket. The two engagement members engage with receptacles that are part of the bracket. One of the receptacles includes a tab which prevents its corresponding engagement member from fully engaging with the receptacle, allowing the attachment mechanism to disengage via disengagement of only one of the engagement members.

20 Claims, 8 Drawing Sheets

WIRELESS ACCESS POINT VERTICAL MOUNT

FIELD

The present application relates to wireless communications and, more particularly, to methods and/or apparatus for mounting a wireless access point to a vertical surface.

BACKGROUND

It is sometimes desirable to mount a wireless access point to a vertical wall. If mounted relatively high on a vertical surface, the wireless access point is less easily damaged as it is positioned out of any typical motion paths that exist within a space. Mounting a wireless access point at a relative high point also can provide improved coverage of an area when compared to a lower relative mounting. For example, a relatively higher mounting point can avoid some interference that might be present at a lower mounting point. Wall mounting of a wireless access point also eliminates a need to allocate table space within a room for the wireless access point.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

As discussed above, mounting of access points on a vertical structure provides several advantages. However, existing solutions generally rely on a bracket and hook type of fastening system. In these existing solutions, either a mounting structure or the access point itself includes a hook, while an opposing side of the solution provides a feature to engage the hook. To mount the access point, the access point portion of the mount is first moved horizontally until contacting the opposing portion. Given the hook configuration, the access point portion is then slid downward vertically to engage the hook with the opposing engagement mechanism. While this technique provides a reasonably secure mounting for the access point, the vertical motion of the access point relative to the mounting structure when engaging the mounting mechanism presents problems with wiring between the access point and the vertical structure.

In particular, access point wiring typically runs horizontally between the vertical structure to which the access point is being mounted and the access point. This wiring provides one or more of power, grounding, or network connectivity with a ground-based digital network (e.g. a corporate intranet or the Internet). With traditional wall mounting techniques as discussed above, vertical movement of the access point after contacting the opposing portion of the mounting structure can cause impinge of the wiring between the vertical structure and the access point. This impingement caused by the vertical movement risks pinching the wires, for example, between a base of the access point and a bracket or structure mount provided for mounting of the access point. In some cases, the impingement of the wires can cause the hook and latch mechanism of the mount to improperly engage, as some weight of the access point is born by the wires themselves, which can prevent full engagement of the hook. In some cases, especially over an extended period of time, the impingement cause break electrical insulation surrounding the wires. In some cases, this breakdown of insulation can result in communication problems with the access point. In a worst case scenario, the impingement of power wiring can present a safety hazard.

The disclosed embodiments offer a solution to this problem via an access point attachment assembly that provides for full engagement of the access point to the vertical structure. This engagement is facilitated via horizontal movement only. By avoiding vertical movement during engagement of the access point to the vertical structure, a horizontal cable channel between the access point and the vertical structure remains intact and unobstructed, reducing any risk of impingement of wires running between the vertical structure and the access point.

Figure 1:
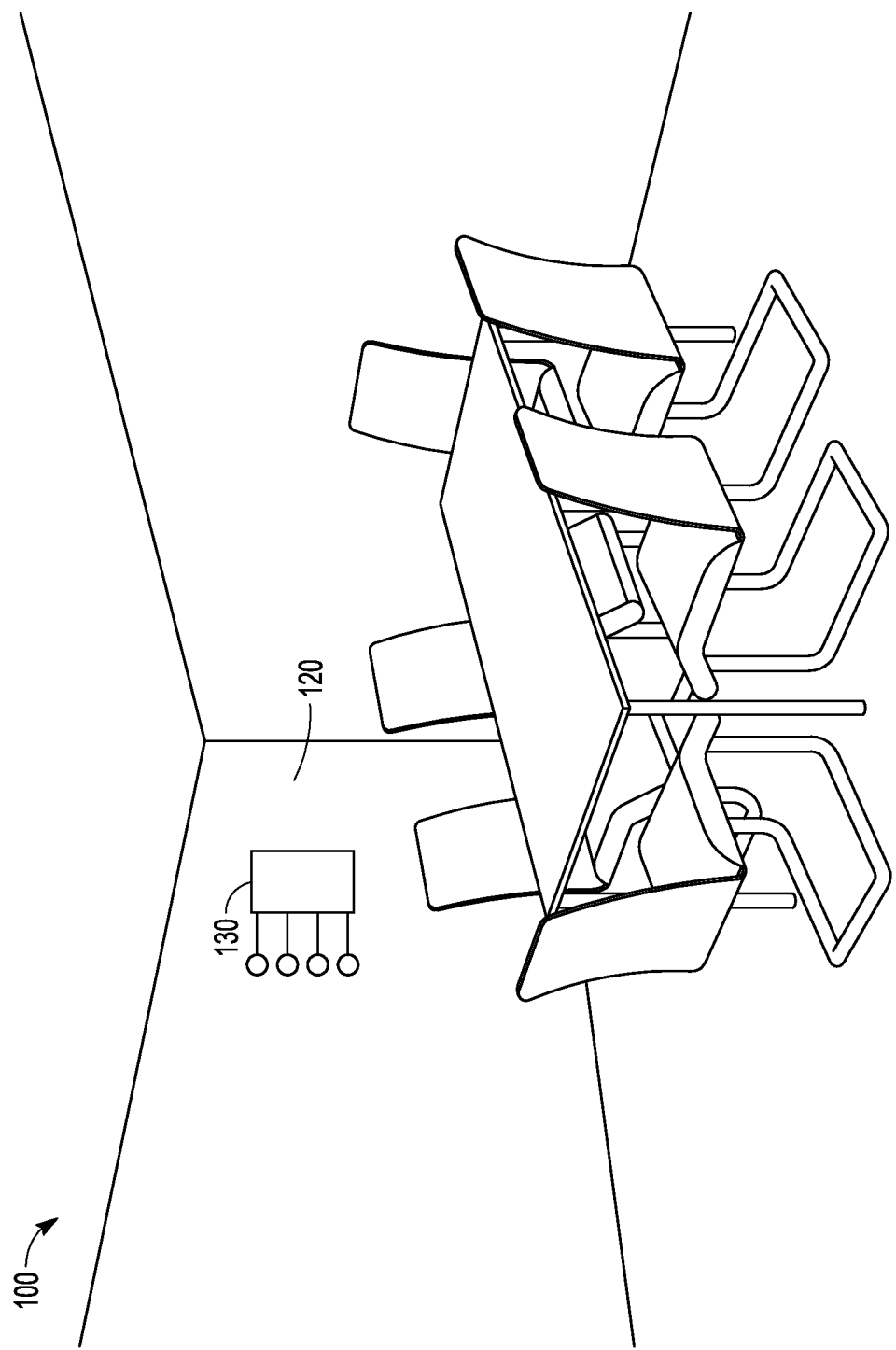
FIG. 1 is an overview diagram of a room including an access point implementing one or more of the disclosed embodiments.

FIG. 1 is an overview diagram of a room 100 including an access point 130 implementing one or more of the disclosed embodiments. In some embodiments, the access point 130 is a wireless access point. FIG. 1 shows that the room 100 includes a vertical structure 120. In this example, the vertical structure 120 is an interior wall, but in other embodiments can be any vertical structure. For example, a concrete pillar is also a vertical structure contemplated by the disclosed embodiments. A wood or steel pole is also contemplated as a vertical structure in some of the disclosed embodiments. In some embodiments, the access point 130 is mounted in an outdoor environment. For example, a metal or wood pole is mounted vertical outdoors in some embodiments, with the disclosed access point mounted to the vertical pole.

By mounting the access point 130 on a vertical structure, some embodiments provide a relatively larger coverage area for the access point than would be the case if the access point was mounted at a relatively lower height. As discussed above, mounting the access point 130 to a vertical structure also avoids the use of table space to support the access point, which saves cost in some environments.

As discussed in more detail below, the access point 130 utilizes an attachment mechanism that requires no vertical motion to affix or mount the access point to the vertical structure 120. Thus, the access point 130 is securable to the vertical structure 120 without any risk of impinging a cable channel running between the access point 130 and the vertical structure 120.

Figure 2:
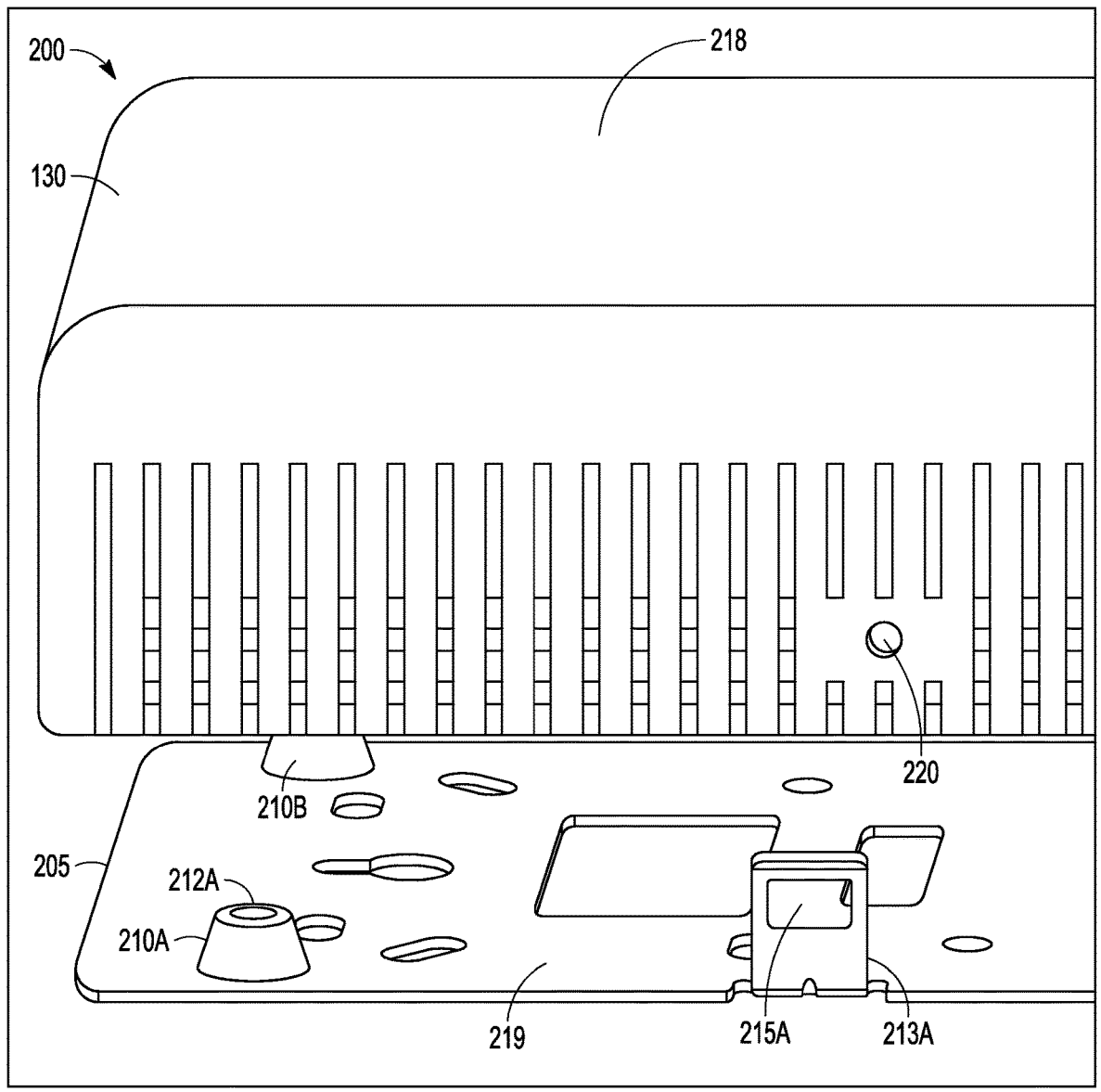
FIG. 2 is a view of an access point and a bracket.

FIG. 2 is a view 200 of an access point and a bracket. The access point 130 of FIG. 1 is shown positioned next to a bracket 205. The bracket 205 includes mounting formations or bosses 210A and 210B. The mounting formations or bosses 210A and 210B include holes 212A and 212B (not shown).

The bracket 205 also includes a tab-less receptacle 213A and a tabbed receptacle 213B (not shown in FIG. 2). Each of the receptacles includes an aperture proximate to a distal end of the receptacle. For example, FIG. 2 shows an aperture 215A in the receptacle 213A. The receptacles 213A (and 213B, not shown) are offset approximately 90 degrees from a plane formed by a surface 219 of the bracket 205. The surface 219 is, in some embodiments, a surface that interfaces with or touches the vertical structure when the bracket 205 is mounted to the vertical structure. Thus, the surface is parallel to a second surface of the vertical structure to which the bracket is mounted.

The receptacles are configured to engage engagement members of the access point 130. The engagement members will be discussed in more detail in subsequent figures. The access point 130 includes a cover 218. The cover 218 includes a release hole 220. The release hole 220 is positioned so as to provide access to an engagement member of the access point 130. By depressing the engagement member via the release hole 220, the access point 130 is disengaged from the tab-less receptacle 213A, and thus the bracket 205.

Figure 3A:
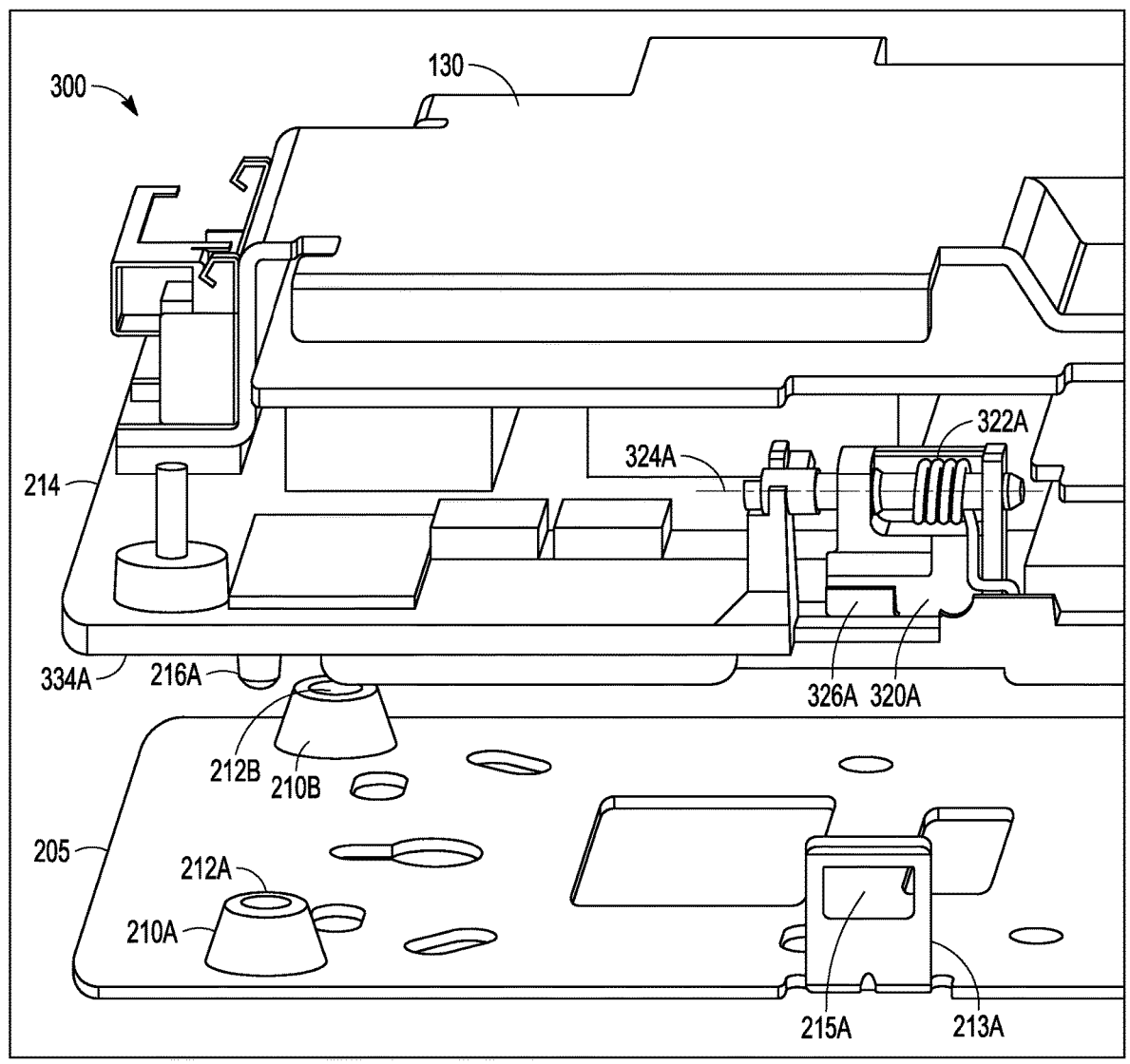
FIG. 3A is another view of an access point and a bracket implementing one or more of the disclosed embodiments.

FIG. 3A is another view of the access point 130 and the bracket 205 implementing one or more of the disclosed embodiments. The view 300 of FIG. 3A shows the access point 130 of FIGS. 1 and 2 with a cover removed, revealing the access point's portion of the attachment mechanism. FIG. 3A shows the mounting formations or bosses 210A and 210B discussed above with respect to FIG. 2. FIG. 3A further illustrates the holes 212A and 212B in the mounting formations or bosses 210A and 210B. The access point 130 includes a base 214. The holes 212A and 212B are configured to accept pins that are integrated with the base 214 of the access point 130. One pin 216 is shown.

When the access point 130 engages with the bracket 205, the pin 216 (and a second pin on an opposing side of the access point 130 and in alignment with the hole 212B) engages with or enters the hole 212A. The second pin (not shown) engages with or enters the hole 212B. When the access point 130 is secured to a vertical structure upon which the bracket 205 is mounted, a weight of the access point 130 is supported by the pin 216 resting within the hole 212A. The weight is also supported by the second pin resting within the hole 212B. Similarly, the weight of the access point 130 is supported by third and fourth pins (also not shown in FIG. 3A) engaged with holes 212C-D (also not shown in FIG. 3A) when the access point 130 is secured to the vertical structure.

FIG. 3A also shows an engagement member 320A. The engagement member 320A is configured with a spring 322A. The spring 322A is configured to apply a force so as to rotate the engagement member on an axis 324A, such that a distal end 326a of the engagement member 320A moves or is forced toward a proximate outside edge 334A of the base 214. In some embodiments, the spring 322A spring-loads the engagement member 320A, thus causing the engagement member 320A to move toward the outside edge 334A of the access point 130 and the tab-less receptacle 213A when the access point 130 is properly aligned with the bracket 205. Properly aligned is defined by pins of the access point 130 being aligned with corresponding holes (e.g. holes 212A-B) in mounting formations or bosses 210A-B of the bracket 205. When the access point 130 is positioned so as to engage the bracket 205, the spring 322A is configured to force a distal end 326A of the engagement member 320A toward the tab-less receptacle 213A.

Figure 3B:
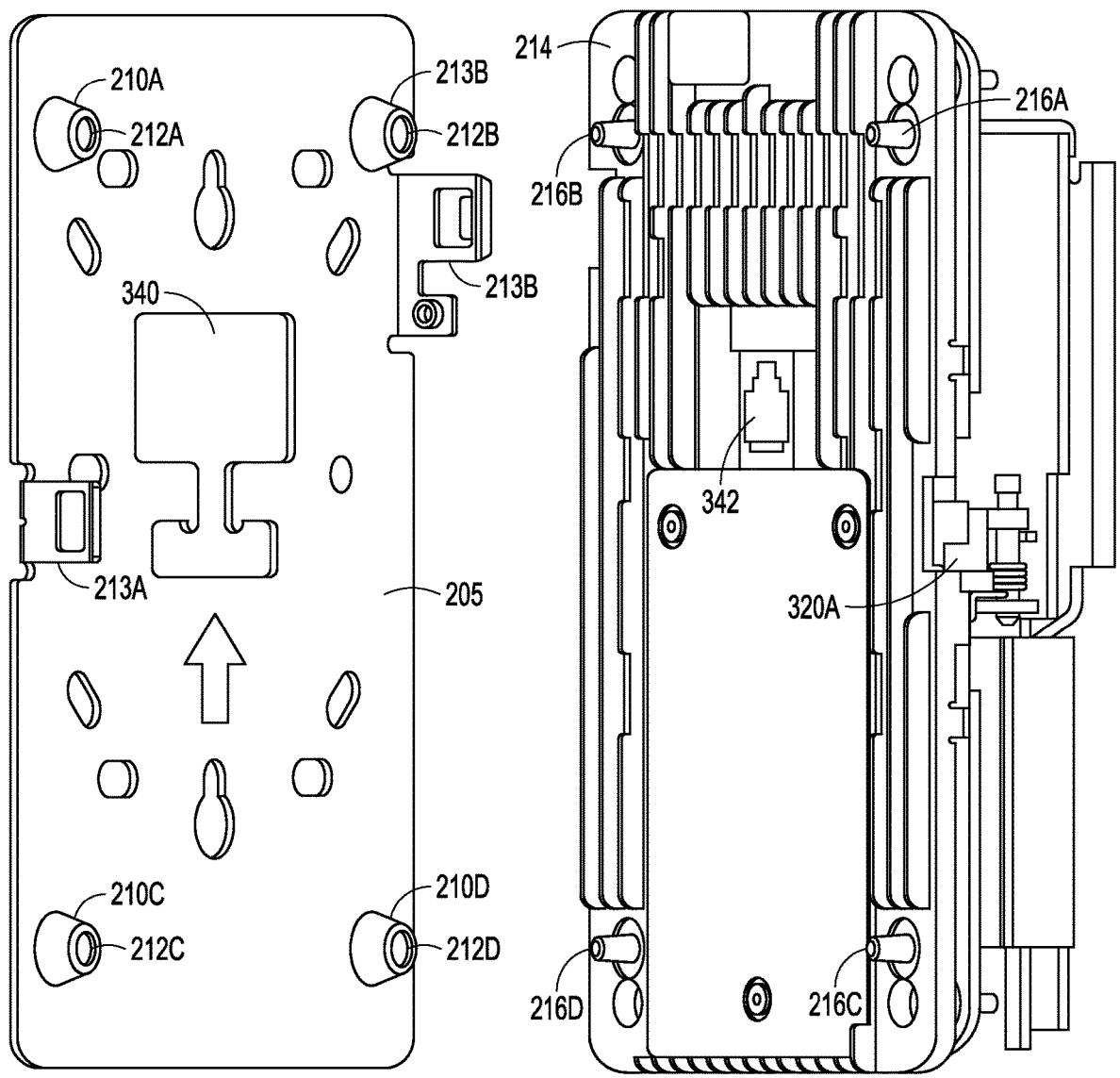
FIG. 3B is another view of an access point and a bracket implementing one or more of the disclosed embodiments.

FIG. 3B is another view of an access point and a bracket implementing one or more of the disclosed embodiments. FIG. 3B shows a bracket 205 with four mounting formations or bosses 210A-D. Each of the mounting formations or bosses 210A-D includes a corresponding hole 212A-D. Each of the holes 212A-D are configured to accept pins 216A-D respectively. The pins 216A-D are attached to the access point base 214. The bracket 205 also includes two receptacles, a tab-less receptable 213A and tabbed receptacle 213B. Note that the two receptacles 213A and 213A are not horizontally aligned on the bracket 205. Instead, the tab-less receptacle 213A is positioned lower on the bracket 205 relative to the tabbed receptacle 213B.

Figure 3C:
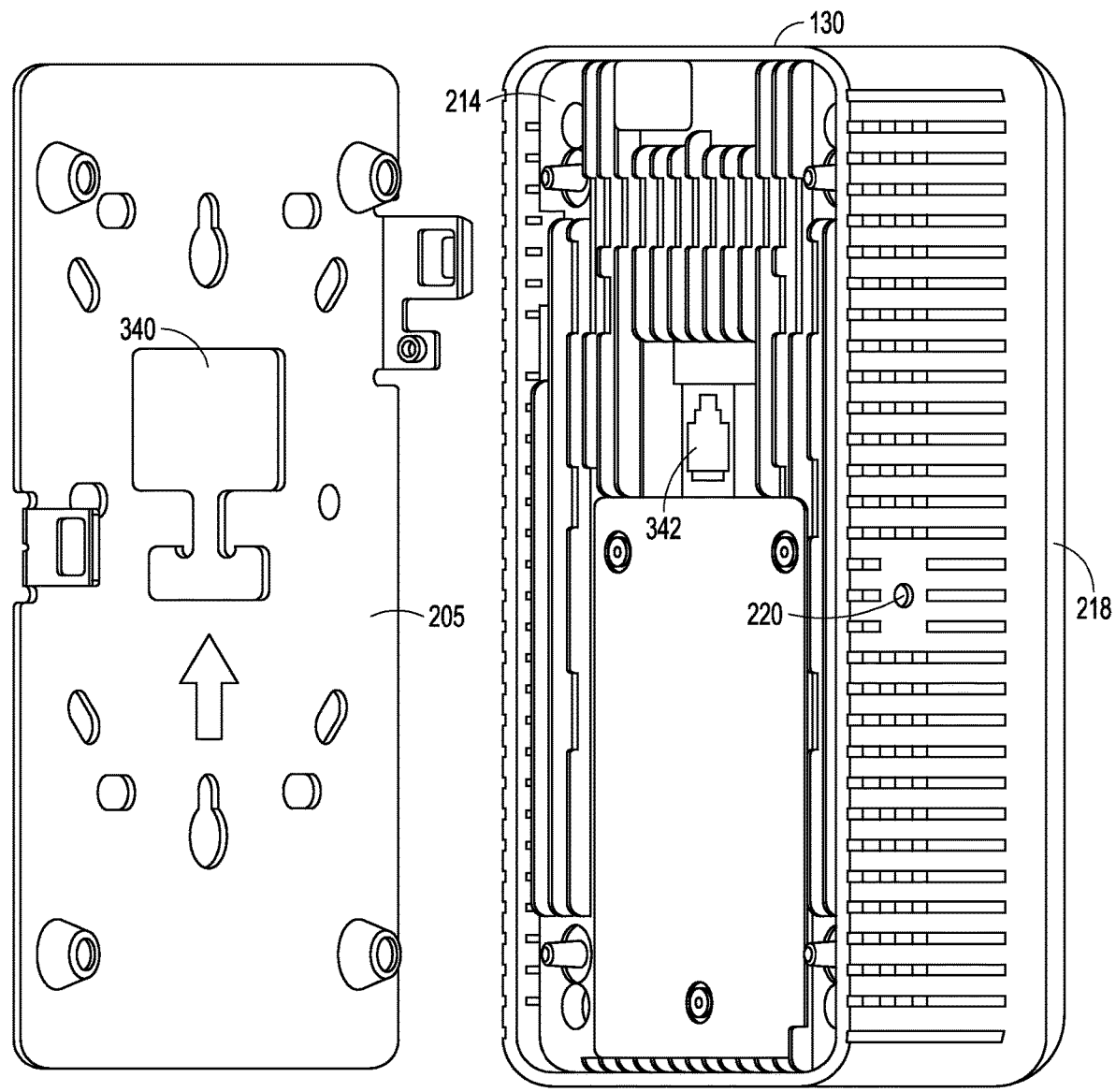
FIG. 3C is another view of an access point and a bracket implementing one or more of the disclosed embodiments.

FIG. 3C is another view of an access point and a bracket implementing one or more of the disclosed embodiments. FIG. 3C shows a bracket 205 and an access point 130. The access point 130 is shown with the cover 218, which includes a release hole 220. Also shown is the cable channel 340, aligned vertically with the cable interfaces 342 of the access point 130.

Figure 4:
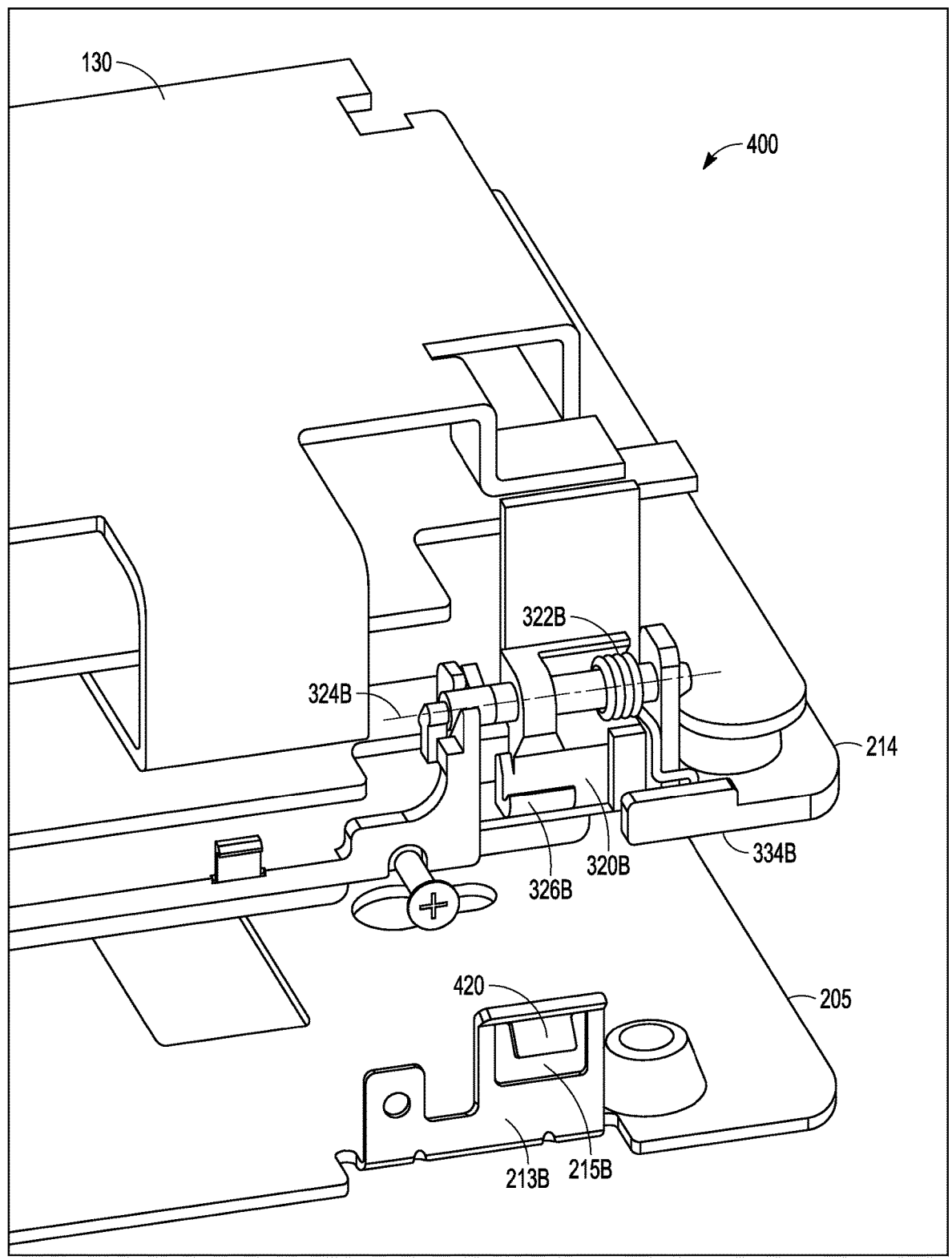
FIG. 4 is an additional view of the access point 130 and the bracket 205.

FIG. 4 is an additional view of the access point 130 and the bracket 205. The view 400 of FIG. 4 shows an opposing side of the access point 130 relative to the view 300 of FIG. 3A. The opposing side of the access point 130 includes a second engagement member 320B. Similar to the first engagement member 320A, the second engagement member 320B is also configured to rotate about an axis 324B. The engagement member 320B is spring loaded, in the illustrated embodiment, via a spring 322B having a similar configuration as the spring 322A with respect to the engagement member 320A. The spring 322B is configured to force a distal end 326b of the second engagement member 320B toward an outside edge 334b of the access point 130 and a tabbed receptacle 213B when the access point 130 is properly aligned with the bracket 205. The tabbed receptacle 213B includes an aperture 215B. When the access point 130 is positioned so as to engage with the bracket 205, the spring 322B is configured to engage the tabbed receptacle 213B, that is positioned on an opposing side of the bracket 205 from the first tab-less receptacle 213A. The engagement member 320B also engages with the aperture 215B, but is prevented from fully engaging when it contacts the tab of the tabbed receptacle 213B. The second tabbed receptacle 213B includes a tab 420, the tab 420 configured to prevent full engagement of the second engagement member 320B with the second tabbed receptacle 213B. The tab 420 provides for release of the second engagement member 320B from the tabbed receptacle 213B without a need to depress the second engagement member 320B away from the tabbed receptacle 213B. This contrasts with the engagement member 320A, for which a release hole 220 is provided. The release hole 220 provides access to the engagement member 320A, which can be used to force the engagement member 320A (e.g. via a pin) away from the tab-less receptacle 213A.

Figure 5:
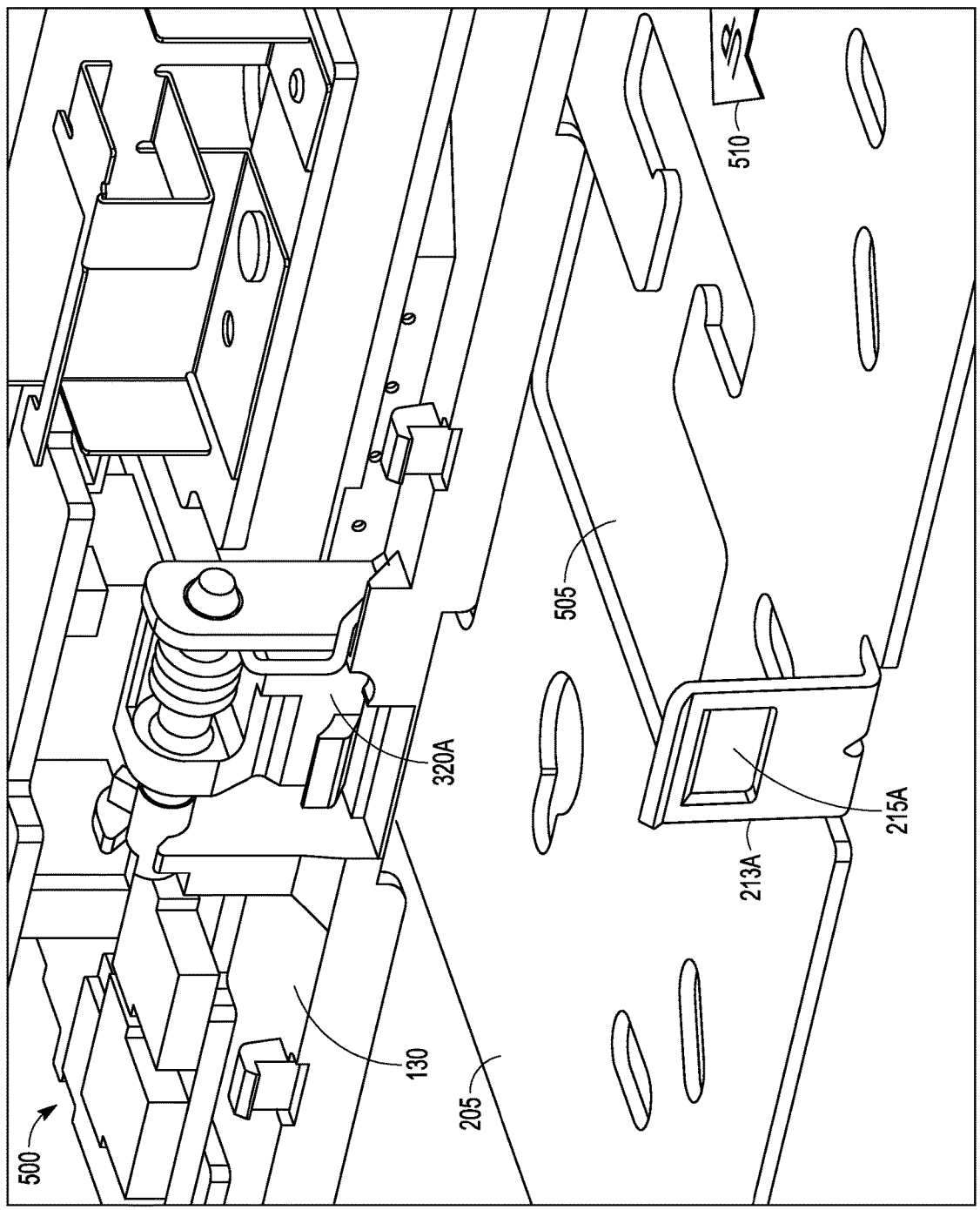
FIG. 5 is another view showing a portion of an access point 130 and a bracket 205.

FIG. 5 is another view 500 showing a portion of an access point 130 and a bracket 205. FIG. 5 shows the engagement member 320A and tab-less receptacle 213A, discussed above. FIG. 5 also shows a cable channel 505 in the bracket 205. The cable channel 505 is positioned within the bracket 205 so as to align horizontally with cable interfaces in the access point 130 (not shown) when the access point 130 is mounted to the bracket 205. The bracket 205 shown in FIG. 5 also includes an orientation indicator 510. The orientation indicator 510 is engraved into the bracket 205 in some embodiments (e.g. laser engraved). The orientation indicator 510 shown in FIG. 5 indicates an upward direction of the bracket 205. This facilitates installation of the bracket, whose orientation may not be apparent to those technicians unfamiliar with it.

Figure 6:
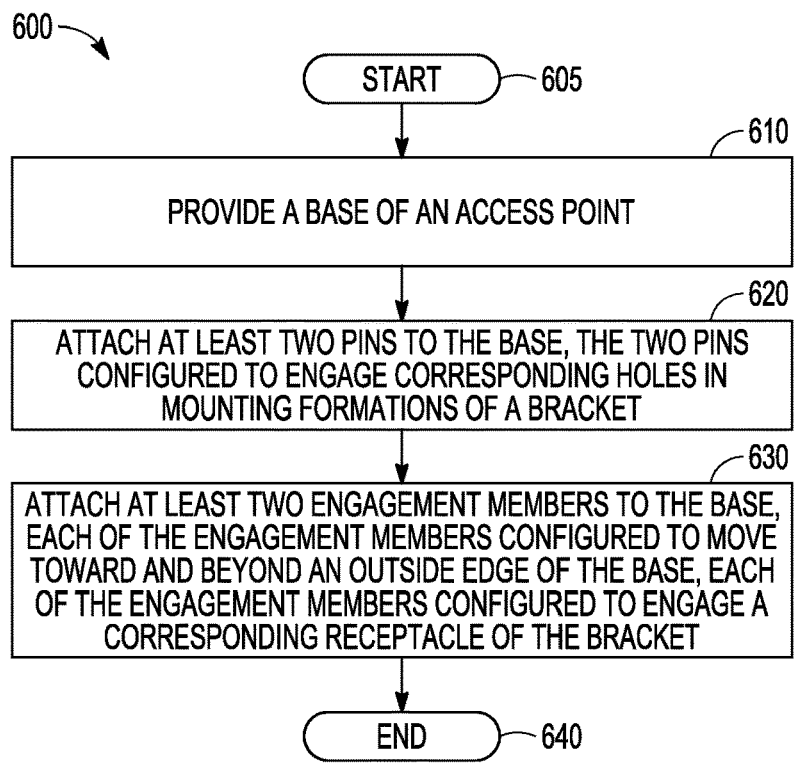
FIG. 6 is a method of manufacturing an access point according to one or more of the disclosed embodiments.

FIG. 6 is a method of manufacturing an access point according to one or more of the disclosed embodiments. After start operation 605, method 600 moves to operation 610, which provides a base of an access point. For example, as discussed above, the access point 130 includes a base, such as the base 214.

In operation 620, at least two pins are attached to the base. The at least two pins are each configured to engage corresponding holes in mounting formations of a bracket. In some embodiments, exactly four pins are attached to the base. In some of these embodiments, the four pins are arranged in a rectangular configuration. Corresponding bosses or mounting formations are present on the bracket to engage with the pins when the access point is attached to the bracket. In some embodiments, the pins are integrated with the base. For example, in some embodiments, the base is an injection molded plastic part with the pins integrated with the base as a single component. In these embodiments, the manufacturing of the access point does not include attaching the pins to the base as they are integrated with the base when the base is formed.

In operation 630, at least two engagement members are attached to the base. The engagement members are attached to the base either directly or indirectly (e.g. with intervening components between the base and the engagement members. One of the at least two engagement members is attached proximate to a first side of the base. A second of the at least two engagement members is attached proximate to a second side of the base, with the second side opposing the first side. In some embodiments, the at least two engagement members consists of four engagement members.

Each of the engagement members are movable. For example, as discussed above, in some embodiments, one or more of the engagement members are configured to rotate about an axis. The engagement members are spring loaded in some embodiments. The springs are configured to cause each of the engagement members to rotate about their respective axis. The rotation moves respective distal ends of each of the engagement members towards and/or beyond a corresponding outside edge of the base. Other embodiments use alternative methods of causing a rotation of the engagement members about their respective axis. The rotation of the engagement members towards and/or beyond an outside edge of the base of the access points facilitates engagement of each of the distal ends of the engagement members with a corresponding receptacle.

Some embodiments of method 600 include attaching a cover to the access point. The cover is configured to include a hole. The hole is positioned on the cover so as to overlay one of the engagement members when the cover is installed or mated to the base. Specifically, the hole is positioned proximate to an engagement members that engages a tab-less receptacle, such as the tab-less receptacle 213A.

After operation 630 completes, method 600 moves to end operation 640.

Figure 7:
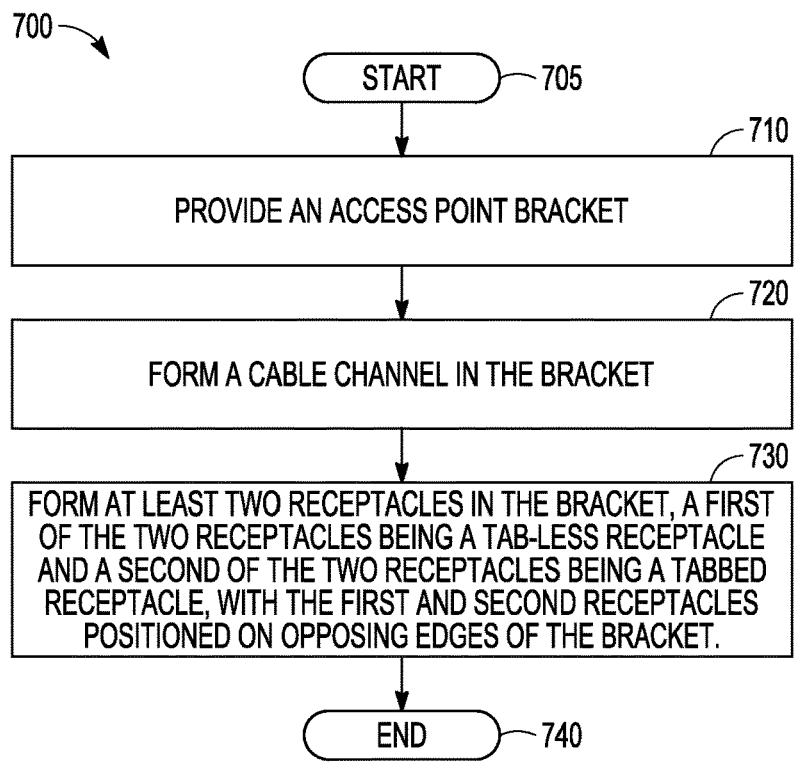
FIG. 7 is a method of manufacturing a bracket for mounting an access point to a vertical structure according to one or more of the disclosed embodiments.

FIG. 7 is a method of manufacturing a bracket for mounting an access point to a vertical structure according to one or more of the disclosed embodiments. After start operation 705, method 700 moves to operation 710, which provides an access point bracket. The access point bracket is comprised of steel in some embodiments. In some embodiments, the access point bracket is plastic.

In operation 720, a cable channel is formed in the bracket. In embodiments that utilize a steel bracket, operation 720 includes cutting the cable channel into the bracket. In some embodiments, the bracket is positioned so as to be aligned with wiring interfaces of an access point when the access point is engaged with the bracket. In some embodiments, the alignment between the wiring interfaces of the access point and the cable channel of the bracket is a horizontal alignment when the bracket is attached to a vertical structure and the access point is engaged with the bracket. Thus, the cable channel is formed in some embodiments so as to horizontally align with the wiring interfaces of the access point when the access point is engaged with the bracket.

Some embodiments that utilize a plastic bracket form the cable channel as part of a molding process of the bracket. Thus, operation 720 is performed, in these embodiments, when the bracket is molded or formed. In some other embodiments, the cable channel is cut into the bracket.

In operation 730, at least two receptacles are formed on or in the bracket. A first of the two receptables is formed as a tab-less receptable (e.g. tab-less receptacle 213A). A second of the two receptacles is a tabbed receptacle (e.g. tabbed receptacle 213B). The first and second receptacles are positioned on opposing edges of the bracket. In some embodiments, the first and second receptacles are aligned horizontally on the bracket when the bracket is mounted to a vertical structure. In some embodiments, the at least two receptacles consist of four receptacles. Thus, some embodiments of the bracket include four receptacles. In some embodiments, two of the four receptacles are tab-less receptacles and a different two of the four receptacles are tabbed receptacles. In some embodiments, the two tab-less receptacles are located on a first side of the base, and the two tabbed receptacles are located on a second side of the base. Each of the tab-less receptacles is horizontally aligned with a tabbed receptacle, in some embodiments.

Thus, in these embodiments, operation 730 includes forming the four receptacles. In some embodiments, for example, embodiments that form the bracket out of steel or other metal material, forming the receptacles includes bending a portion of a steel sheet from which the bracket is constructed to be at a 90 degree angle with another portion of the steel sheet. Forming the receptacles can also include cutting an aperture in the receptacle. In embodiments that utilize plastic to form the bracket, forming the receptacles includes, in some embodiments, molding the bracket via a mold that includes the receptacles. In these embodiments, no explicit cutting or bending is performed to form the receptacles.

After operation 730 completes, method 700 moves to end operation 740.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

The techniques of various embodiments may be implemented using software, hardware and/or a combination of software and hardware. Various embodiments are directed to apparatus, e.g., management entities, e.g., a network monitoring node, routers, gateways, switches, access points, DHCP servers, DNS servers, AAA servers, user equipment devices, e.g., wireless nodes such as mobile wireless terminals, base stations, communications networks, and communications systems. Various embodiments are also directed to methods, e.g., method of controlling and/or operating a communications device or devices, e.g., a network management node, an access point, wireless terminals (WT), user equipment (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed are provided as example approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, analyzing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the operations of the disclosed embodiments.

In some embodiments, the processor or processors, e.g., CPUs, of one or more devices, e.g., communications devices such as routers, switches, network attached servers, network management nodes, wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node, an access point, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of a communications system including wired, optical, cellular, Wi-Fi, Bluetooth and BLE, at least some of the methods and apparatus of various embodiments are applicable to a wide range of communications systems including IP and non IP based, OFDM and non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with IP based and non-IP, wired and wireless such CDMA, orthogonal frequency division multiplexing (OFDM), Wi-Fi, Bluetooth, BLE, optical and/or various other types of communications techniques which may be used to provide communications links between network attached or associated devices or other devices including receiver/transmitter circuits and logic and/or routines, for implementing the methods.

Although the discussion above describes, in some instances, determining location of a wireless terminal in a two-dimensional space, the features described above may be applied equally to locating a wireless terminal in a three-dimensional space. As such, in a three-dimensional space, rather than determining a location of a WT in a specific cell or region, some of the disclosed embodiments determine a location of a WT within a three-dimensional region when considering a plurality of three-dimensional regions.

Example 1 is an attachment assembly for attaching a wireless access point to a vertical structure, comprising: a bracket comprising: at least two mounting formations, each of the mounting formations including a hole, and at least two receptacles, the at least two receptacles positioned at opposing sides of the bracket, the two receptacles horizontally aligned when the bracket is mounted to the vertical structure; and a wireless access point base comprising: at least two pins, each of the pins positioned on the base so as to enter a corresponding hole of one of the mounting formations that corresponds to the pin, and at least two engagement members, each of the engagement members configured to engage a corresponding one of the at least two receptacles when the wireless access point base is engaged with the bracket.

In Example 2, the subject matter of Example 1 optionally includes wherein the at least two engagement members are each configured to rotate about a corresponding axis.

In Example 3, the subject matter of Example 2 optionally includes at least two springs, each of the springs configured to apply a force to a corresponding engagement member so as to rotate a distal end of the engagement member toward a proximate outside edge of the wireless access point base.

In Example 4, the subject matter of any one or more of Examples 1-3 optionally include degrees offset from a surface of the bracket.

In Example 5, the subject matter of Example 4 optionally includes wherein a distal end of each of the engagement members is configured to engage a corresponding receptacle via the aperture of the corresponding receptacle.

In Example 6, the subject matter of any one or more of Examples 4-5 optionally include wherein the aperture is proximate to a distal end of the receptacle.

In Example 7, the subject matter of any one or more of Examples 1-6 optionally include wherein the bracket includes a cable channel, the cable channel horizontally aligned with wiring interfaces of the wireless access point base when the at least two engagement members are engaged with the at least two receptacles.

In Example 8, the subject matter of any one or more of Examples 1-7 optionally include wherein the mounting formations of the bracket are bosses, with the holes in the mounting formations horizontally offset from the bracket when the bracket is mounted to the vertical structure.

In Example 9, the subject matter of any one or more of Examples 1-8 optionally include wherein one of the at least two receptacles is a tabbed receptacle, and a second of the at least two receptacles is a tab-less receptacle.

In Example 10, the subject matter of Example 9 optionally includes an access point cover, the access point cover including a hole proximate to one of the at least two engagement members, the hole positioned so as to provide for depressing the engagement member via the hole.

In Example 11, the subject matter of Example 10 optionally includes wherein the hole is proximate to an engagement member configured to engage the tab-less receptacle.

In Example 12, the subject matter of any one or more of Examples 1-11 optionally include wherein the at least two engagement members consists of four engagement members, and the at least two receptacles consists of four receptacles.

In Example 13, the subject matter of Example 12 optionally includes wherein two of the four receptacles are tab-less receptacles and two of the four receptacles are tabbed receptacles.

In Example 14, the subject matter of Example 13 optionally includes wherein the two tab-less receptacles are located on a first side of the wireless access point base, and the two tabbed receptacles are located on a second side of the wireless access point base.

Example 15 is an access point, comprising: a base comprising at least two pins, each of the pins positioned on the base so as to enter a corresponding hole in a corresponding mounting formation of a bracket, and at least two engagement members, each of the engagement members configured to rotate about a corresponding axis so as to engage a corresponding receptacle of the bracket.

In Example 16, the subject matter of Example 15 optionally includes at least two springs, each of the springs configured to apply a force to a corresponding engagement member so as to rotate a distal end of the engagement member toward a proximate outside edge of the wireless access point base.

In Example 17, the subject matter of Example 16 optionally includes wherein a distal end of each of the engagement members is configured to engage the corresponding receptacle via an aperture of the corresponding receptacle.

In Example 18, the subject matter of any one or more of Examples 15-17 optionally include a wiring interface, wherein the bracket includes a cable channel, the cable channel horizontally aligned with the wiring interface when the at least two engagement members are engaged with the at least two receptacles.

In Example 19, the subject matter of any one or more of Examples 15-18 optionally include wherein the mounting formations of the bracket are bosses, with the holes in the mounting formations horizontally offset from a surface of the bracket when the bracket is mounted to a vertical structure.

In Example 20, the subject matter of any one or more of Examples 15-19 optionally include wherein the at least two engagement members consists of four engagement members, and the at least two receptacles consists of four receptacles.

What is claimed is:

1. An attachment assembly for attaching a wireless access point to a vertical structure, the assembly comprising:
    a bracket comprising:
        at least two mounting formations, each of the mounting formations including a hole, and
        at least two receptacles, positioned proximate to opposing sides of the bracket, the two receptacles horizontally aligned when the bracket is mounted to the vertical structure; and
    a wireless access point base comprising:
        at least two pins, each of the pins positioned on the base to enter a corresponding hole of one of the mounting formations that corresponds to the pin, and
        at least two engagement members, each of the engagement members configured to engage a corresponding one of the at least two receptacles when the wireless access point base is engaged with the bracket.

2. The attachment assembly of claim 1, wherein the at least two engagement members are each configured to rotate about a corresponding axis.

3. The attachment assembly of claim 2, further comprising at least two springs, each of the springs configured to apply a force to a corresponding engagement member so as to rotate a distal end of the engagement member toward a proximate outside edge of the wireless access point base.

4. The attachment assembly of claim 1, wherein each of the at least two receptacles includes an aperture that is 90 degrees offset from a surface of the bracket.

5. The attachment assembly of claim 4, wherein a distal end of each of the engagement members is configured to engage a corresponding receptacle via the aperture of the corresponding receptacle.

6. The attachment assembly of claim 4, wherein the aperture is proximate to a distal end of the receptacle.

7. The attachment assembly of claim 1, wherein the bracket includes a cable channel, the cable channel horizontally aligned with wiring interfaces of the wireless access point base when the at least two engagement members are engaged with the at least two receptacles.

8. The attachment assembly of claim 1, wherein the mounting formations of the bracket are bosses, with the holes in the mounting formations horizontally offset from the bracket when the bracket is mounted to the vertical structure.

9. The attachment assembly of claim 1, wherein one of the at least two receptacles is a tabbed receptacle, and a second of the at least two receptacles is a tab-less receptacle.

10. The attachment assembly of claim 9, further comprising an access point cover, the access point cover including a hole proximate to one of the at least two engagement members, the hole positioned so as to provide for depressing the engagement member via the hole.

11. The attachment assembly of claim 10, wherein the hole is proximate to an engagement member configured to engage the tab-less receptacle.

12. The attachment assembly of claim 1, wherein the at least two engagement members consists of four engagement members, and the at least two receptacles consists of four receptacles.

13. The attachment assembly of claim 12, wherein two of the four receptacles are tab-less receptacles and two of the four receptacles are tabbed receptacles.

14. The attachment assembly of claim 13, wherein the two tab-less receptacles are located on a first side of the wireless access point base, and the two tabbed receptacles are located on a second side of the wireless access point base.

15. An access point, comprising:
a base comprising at least two pins, each of the pins positioned on the base to enter a corresponding hole in a corresponding mounting formation of a bracket, and
at least two engagement members, each of the engagement members configured to rotate about a corresponding axis so as to engage a corresponding receptacle of the bracket.

16. The access point of claim 15, further comprising at least two springs, each of the springs configured to apply a force to a corresponding engagement member so as to rotate a distal end of the engagement member toward a proximate outside edge of the wireless access point base.

17. The access point of claim 16, wherein a distal end of each of the engagement members is configured to engage the corresponding receptacle via an aperture of the corresponding receptacle.

18. The access point of claim 15, further comprising a wiring interface, wherein the bracket includes a cable channel, the cable channel horizontally aligned with the wiring interface when the at least two engagement members are engaged with the at least two receptacles.

19. The access point of claim 15, wherein the mounting formations of the bracket are bosses, with the holes in the mounting formations horizontally offset from a surface of the bracket when the bracket is mounted to a vertical structure.

20. The access point of claim 15, wherein the at least two engagement members consists of four engagement members, and the at least two receptacles consists of four receptacles.

* * * * *